(12) United States Patent
Ehrhardt et al.

(10) Patent No.: US 8,322,001 B2
(45) Date of Patent: Dec. 4, 2012

(54) FASTENING DEVICE

(75) Inventors: Thomas Ehrhardt, Kaiserslautern (DE);
Ernst Ludwig Hahn, Rabenau (DE);
Harald Schaety, Wetzlar (DE)

(73) Assignee: Newfrey LLC, Newark, DE (US)

( * ) Notice: Subject to any disclaimer, the term of this patent is extended or adjusted under 35 U.S.C. 154(b) by 0 days.

(21) Appl. No.: 12/503,280

(22) Filed: Jul. 15, 2009

(65) Prior Publication Data

US 2011/0154621 A1 Jun. 30, 2011

(30) Foreign Application Priority Data

Jul. 16, 2008 (DE) .......................... 10 2008 033 307

(51) Int. Cl.
*F16B 21/09* (2006.01)
*B60R 13/02* (2006.01)
(52) U.S. Cl. ................. 24/289; 24/457; 24/662; 24/681
(58) Field of Classification Search .................... 24/289, 24/293, 297, 457, 458, 453, 662, 681, 581.11; 296/1.08, 146.7; 411/339, 508, 510, 908
See application file for complete search history.

(56) References Cited

U.S. PATENT DOCUMENTS

| | | | | |
|---|---|---|---|---|
| 1,612,943 A * | 1/1927 | Reiter | ............................. | 24/681 |
| 1,904,077 A * | 4/1933 | Place | ............................. | 52/511 |
| 3,551,963 A * | 1/1971 | Mosher, Jr. et al. | ............ | 24/618 |
| 5,507,610 A * | 4/1996 | Benedetti et al. | ............ | 411/339 |
| 5,651,632 A * | 7/1997 | Gordon | ......................... | 403/319 |
| 5,756,185 A * | 5/1998 | Lesser | ............................. | 428/192 |
| 5,850,676 A * | 12/1998 | Takahashi et al. | .............. | 24/297 |
| 5,934,758 A * | 8/1999 | Ritch et al. | ............... | 297/452.54 |
| 5,975,820 A * | 11/1999 | Kirchen | ......................... | 411/339 |
| 6,196,607 B1 * | 3/2001 | Gulisano | ....................... | 296/39.1 |
| 6,431,585 B1 * | 8/2002 | Rickabus et al. | .......... | 280/728.3 |
| 6,594,870 B1 * | 7/2003 | Lambrecht et al. | ............. | 24/297 |
| 6,843,630 B2 * | 1/2005 | Sbongk | .......................... | 411/508 |
| 6,886,874 B2 * | 5/2005 | Abe | ............................. | 296/1.08 |
| 7,114,221 B2 * | 10/2006 | Gibbons et al. | ................ | 24/289 |
| 7,155,783 B2 * | 1/2007 | Nessel et al. | .................... | 24/289 |
| 7,178,205 B2 * | 2/2007 | Nessel et al. | .................... | 24/289 |
| 7,178,855 B2 * | 2/2007 | Catron et al. | ............. | 296/146.7 |
| 7,179,013 B2 * | 2/2007 | Benedetti | ...................... | 403/388 |
| 7,198,315 B2 * | 4/2007 | Cass et al. | ....................... | 296/29 |
| 7,328,489 B2 * | 2/2008 | Leverger et al. | ................ | 24/453 |
| 7,454,826 B2 * | 11/2008 | Nessel et al. | .................... | 29/453 |
| 2006/0032029 A1 * | 2/2006 | Nessel et al. | .................... | 24/289 |
| 2006/0032030 A1 * | 2/2006 | Nessel et al. | .................... | 24/289 |
| 2006/0197356 A1 * | 9/2006 | Catron et al. | ............. | 296/146.7 |
| 2008/0298890 A1 * | 12/2008 | Koike | ........................ | 403/408.1 |

(Continued)

FOREIGN PATENT DOCUMENTS

EP 0020308 A1 10/1980

(Continued)

*Primary Examiner* — Robert J Sandy
*Assistant Examiner* — Tyler Johnson
(74) *Attorney, Agent, or Firm* — Michael P. Leary

(57) ABSTRACT

A fastener for fastening an attached or trim part to a support part includes a receptacle part having a pocket with a lateral opening and a guide slot, and a connecting part having at least one flange that can be introduced into the pocket through the lateral opening and having a fastening section. The fastening section has an opening to accommodate a retaining stud projecting from the support part. Located in the opening are latching fingers which can hold the retaining stud in place in the opening.

17 Claims, 3 Drawing Sheets

U.S. PATENT DOCUMENTS

| | | | |
|---|---|---|---|
| 2009/0019674 A1* | 1/2009 | Sato et al. | 24/289 |
| 2009/0165263 A1* | 7/2009 | Smith | 24/297 |
| 2009/0188086 A1* | 7/2009 | Okada et al. | 24/297 |
| 2011/0123294 A1* | 5/2011 | Kempf et al. | 411/508 |

FOREIGN PATENT DOCUMENTS

| | | |
|---|---|---|
| EP | 0489505 B1 | 7/1994 |
| EP | 1895171 A2 | 3/2008 |
| WO | 02/072390 A1 | 9/2002 |

* cited by examiner

FASTENING DEVICE

CROSS-REFERENCE TO RELATED APPLICATIONS

This application claims priority from German Patent Application No. 10 2008 033 307.7, filed on Jul. 16, 2008, the disclosure of which is incorporated herein by reference.

FIELD OF THE INVENTION

The invention relates to a fastener for fastening an attached part or trim part to a support part, in particular a body part of a motor vehicle, with a receptacle part that has a pocket with a lateral opening and a guide slot, and with a connecting part that has at least one flange that can be introduced into the pocket through the lateral opening.

Fasteners of the specified type are used primarily in automotive manufacture for fastening trim parts and attached parts to the vehicle body or to body parts such as doors and the like. It is often advantageous to provide fastening in the simplest possible manner and without the aid of tools, and there is frequently a need to be able to compensate for dimensional variations of the parts in the vicinity of the fastener.

BACKGROUND OF THE INVENTION

Various fasteners of the specified type are known from EP 0,020,308 A1, EP 1,895,171 A2, U.S. Pat. No. 6,196,607 B1, for example. The prior art fasteners have in common that an element in the shape of a stud is provided as the connecting part and is joined to the support part in a latching manner by insertion through an opening in the support part. It is a disadvantage here that the support part must have openings at the fastening points and that additional means such as a dished washer and possibly additional sealing rings must be provided so that these openings can be tightly sealed during installation of the attached parts or trim parts.

Moreover, a device for fastening a sound-absorbing panel to the body of a motor vehicle is known from WO 02/072390 A1, wherein the body has a stud onto which a one-piece plastic fastener can be placed. The plastic fastener here is located in an opening of the sound-absorbing panel and engages around the sound-absorbing panel on the side facing away from the body by means of an annular flange. Such a design is unsuitable for fastening decorative trim parts.

In addition, a plastic clip for fastening a trim strip to the body of a motor vehicle is known from EP 0,489,505 B1; said clip snaps onto a T-shaped stud welded to the body panel and has lateral latching fingers that engage in opposing grooves on the inside of the trim strip, which is bent into a U shape. Such a clip is also unsuitable for fastening flat trim parts.

SUMMARY OF THE INVENTION

According to one aspect of the invention, a fastener for fastening attached parts or trim parts does not require fastening openings in the parts that are to be joined together. The fastener may be simple to install and may consist of simple parts that can be manufactured inexpensively. It may also provide the capability to compensate for manufacturing-related dimensional variations, but may also be suitable for providing a fixed mounting point. Lastly, it may be possible to separate the parts joined by the fastener without damage.

According to one embodiment of the invention, the fastener is comprised of a receptacle part having a pocket with a lateral opening and a guide slot, and a connecting part having at least one flange that can be introduced into the pocket through the lateral opening and having a fastening section, wherein the fastening section has an opening to accommodate a stud projecting from the support part and has elastic retaining means in the opening by which the stud can be held in place in the opening.

The fastener according to an aspect of the invention may thus be comprised of three parts, namely a receptacle part, a connecting part, and a stud, wherein the connecting part can be connected to both the receptacle part and the stud. The receptacle part is suitable for attachment to an attached part or a trim part, and can also be an integral part of the attached part or trim part. In contrast, the stud is especially suited for attachment to a metallic support part, for example a body part, and can be joined to a support part in a simple manner using a conventional stud welding method without making an opening. The connecting part may be made of plastic, and can be joined to the receptacle part and the stud by a simple insertion process in each case.

According to a further proposal of the invention, the fastening section of the connecting part is designed as a hollow body, wherein one end of the hollow body is attached to the flange, and the other end has an insertion opening for a retaining stud, and wherein the retaining means for holding the retaining stud in place are located on the inside of the hollow body. The wall of the hollow body preferably consists of cylindrical wall sections and of fluted wall sections that are located between the cylindrical wall sections and that have the raised side of their flute profile projecting into the hollow body. This design permits guidance of the fastening section into the guide slot of the receptacle part with the aid of the cylindrical wall sections with simultaneous guidance and centering of the retaining stud in the interior of the hollow body with the aid of the fluted wall sections. To facilitate the insertion and centering of the retaining stud relative to the fastening section even in the presence of lateral offset of the fastening section relative to the retaining stud, provision can additionally be made for the end faces of the fluted wall sections to be beveled in the vicinity of the insertion opening so as to form guide surfaces inclined in the insertion direction.

According to a further proposal of the invention, at least one elastic latching finger that extends in the insertion direction from the insertion opening is arranged on the inside of the hollow body to hold the retaining stud in place. The latching finger is advantageously attached at its end adjacent to the insertion opening to a cylindrical wall section of the hollow body by an elastically flexible section. The cylindrical wall section can have a reinforcement that increases the wall thickness in the area of the attachment point to support the bending load.

The flange of the connecting part may have a circular ring whose inside diameter is greater than the outside diameter of the fastening section, and which is connected to the fastening section by radial webs. To enlarge the contact area of the flange, individual intermediate spaces of the webs can be closed by a smooth wall on the side facing the insertion opening.

The receptacle part may comprise a plate with an open guide slot on one plate side, and a U-shaped wall that projects from one side of the plate and surrounds the guide slot at a distance. Attached to the edge of the projecting wall distant from the plate can be a cover plate, which closes off the space enclosed by the projecting wall at a sufficient distance from the plate so that a large enough space remains to receive the flange of the connecting part. The receptacle part can also be an integral part of the attached part or trim part, wherein the cover plate is composed of the trim part. However, the receptacle part can also be produced as a separate part and be attached later to the cover plate on the attached part or trim part by bonding, welding, or a similar method. According to another proposal of the invention, introduction of the connecting part into the pocket of the receptacle part can be facilitated by the means that the guide slot has an entry section that grows larger toward the outside. Moreover, the plate can have, in the edge region adjacent to the entry of the guide slot, a ramp surface that is inclined towards the edge and whose distance from the cover plate increases towards the edge.

In order to secure the connecting part against falling out after placement in the receptacle part, the plate of the receptacle part may be additionally provided with at least one raised bump that is located opposite the cover plate and has a distance therefrom that is slightly smaller than the thickness of the flange of the connecting part. The bump provides a resistance that can be overcome with light force but that is sufficient to keep the connecting part from coming out by itself once placed in the pocket. The introduction of the connecting part can be further eased by additional ramps on the insertion side of the bump.

BRIEF DESCRIPTION OF THE DRAWINGS

The invention is explained in detail below on the basis of an example embodiment that is shown in the drawings. They show.

DETAILED DESCRIPTION OF EXEMPLARY EMBODIMENTS OF THE INVENTION

Figure 1:
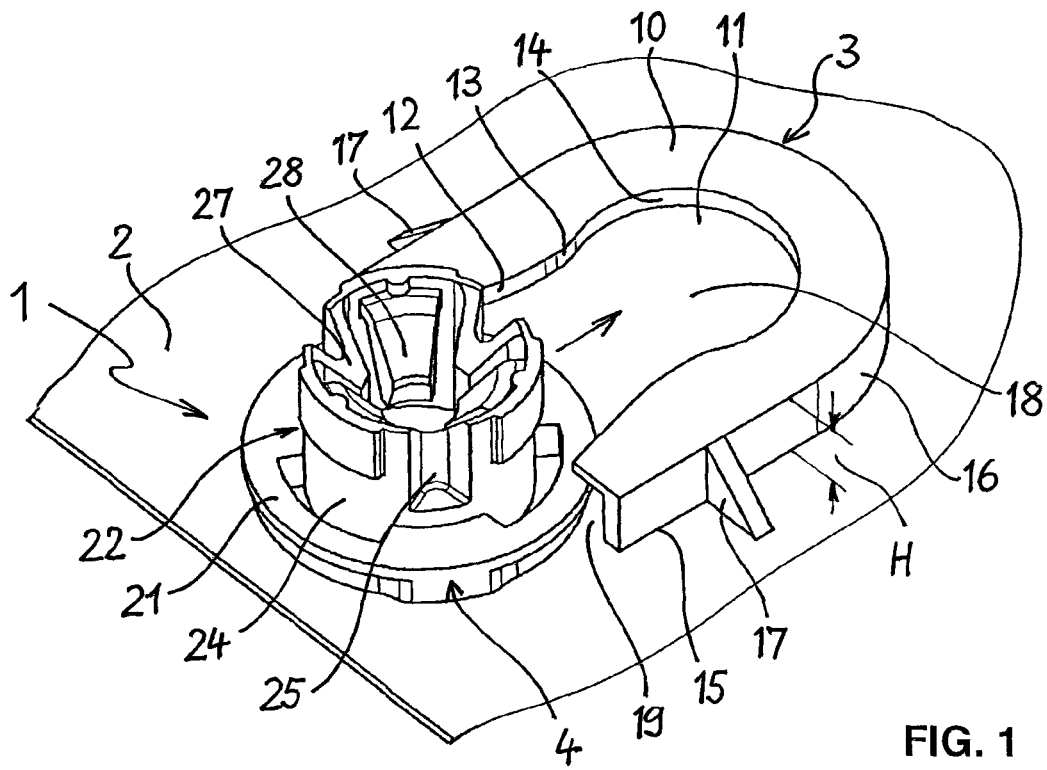
FIG. 1 a perspective view of a receptacle part and a connecting part of a fastener according to an exemplary embodiment of the invention in a position ready for installation, FIG. 2 a cross-section through a fastener according to an exemplary embodiment of the invention, FIG. 3 a perspective view of the side of a receptacle part and connecting part facing the support part in the installed position, FIG. 4 a perspective view of the side of the receptacle part and connecting part from FIG. 3 that faces the trim part, FIG. 5 a perspective view of the side facing the support part of a receptacle part fastened to a connecting part to form a fixed point, and FIG. 6 a perspective view of the side of the receptacle part and connecting part from FIG. 5 that faces the trim part.
Figure 2:
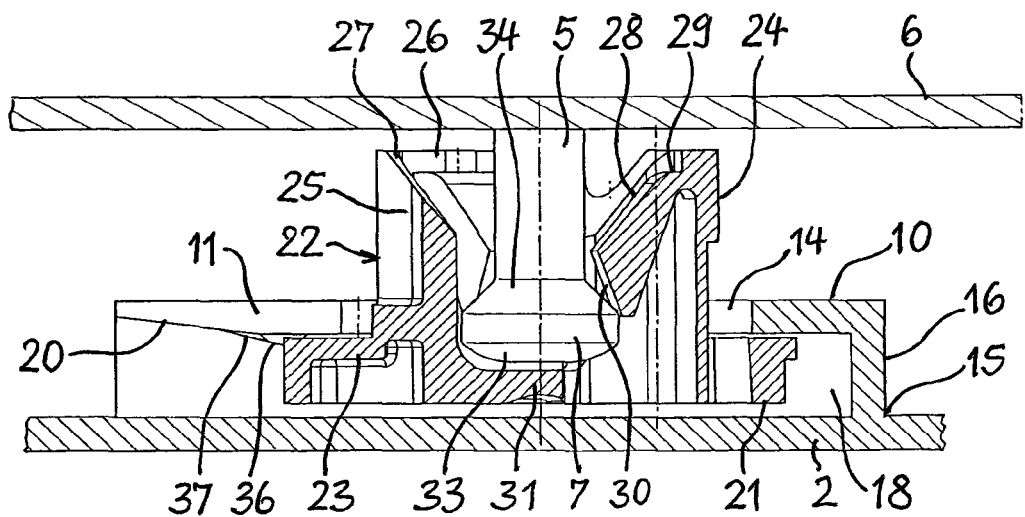

The fastener 1 shown in FIGS. 1 and 2 includes a receptacle part 3 fastened to a panel-like trim part 2, a connecting part 4, and a T-shaped retaining stud 5 that is attached to a support part 6 and has a head 7 at its free end. The trim part 2, the receptacle part 3, and the connecting part 4 are made of thermoplastic material. The retaining stud 5 and the support part 6 are made of metal and are welded to one another. However, the invention is not limited to the use of the stated materials. The trim part and receptacle part may be made of metal, and the support part and retaining stud may be made of plastic.

The receptacle part 3 has a flat plate 10 with a guide slot 11, which forms an entry region 12 that enlarges conically towards the edge of the plate, a narrow point 13, and a circular end region 14 whose diameter is larger than the width of the narrow point 13. Extending along the outer edge 15 of the plate 10 is a U-shaped wall 16, which surrounds the guide slot 11 at a distance. The wall 16 is perpendicular to the plate 10 and has a constant height H. The edge 15 of the wall 16 distant from the plate 10 is permanently attached to the trim part 2. Adjacent to the entry region 12 are parallel sections of the wall 16, which, on their outside facing away from the guide slot 11, are additionally supported against the trim part 2 by triangular ribs 17. In conjunction with the trim part 2, the receptacle part 3 forms a pocket 18 with a lateral insertion opening 19 into which the connecting part 4 may be placed. In the edge region adjacent to the insertion opening 19, the plate 10 has, on the side facing the trim part 2, a ramp surface 20 that is inclined toward the edge and whose distance from the trim part 2 increases towards the edge. Insertion of the trim part 2 is facilitated by this means.

The connecting part 4 has an annular flange 21, which surrounds an end of a fastening section 22 in the form of a cup-like hollow body and is rigidly connected to the fastening section 22 by radial webs 23. The thickness and diameter of the flange 21 are dimensioned such that the flange 21 can be inserted into the pocket 18. The hollow body of the fastening section 22 has an external wall composed of three cylindrical wall sections 24 and fluted wall sections 25 located therebetween. The fluted wall sections 25 extend parallel to the center axis of the cylindrical wall sections 24, and the raised side of their flute profile projects into the hollow body. The end of the fastening section 22 that is distant from the flange 21 forms an insertion opening 26. The ends of the fluted wall sections 25 are beveled in the vicinity of the insertion opening 26 such that their end faces form guide surfaces 27 that are inclined in the insertion direction in order to center an inserted stud.

Attached to each of the cylindrical wall sections 24 on the inside of the fastening section 22 is an elastic latching finger 28 that extends in the insertion direction and towards the center from the insertion opening 26. Near the insertion opening 26, an end of the latching finger 28 is affixed to the associated wall section 24 by an elastically flexible section 29. The wall sections 24 are provided with a reinforcement that increases the wall thickness in the area of the attachment point of the latching fingers 28, which reinforcement forms a raised shoulder on the outside of the wall sections 24. The free ends of the latching fingers 28 are located a distance from the end of the fastening section 22 that is near the flange, and have support areas 30 for bracing against the head 7 of a retaining stud 5. Located in the center of the end of the fastening section 22 that is near the flange is a rigid stop 31, which is attached to the wall sections 25 by webs. The stop 31 limits the depth to which the retaining stud 5 can penetrate the fastening section 22.

The retaining stud 5 that can be placed in the fastening section 22 has a head 7 of a larger diameter than the stud shank. The head 7 is delimited at its top by a cap area 33 of convex curvature and at its underside by a conical contact area 34. The cap area 33 facilitates centering of the head 7 in the insertion opening 26 and spreading of the latching fingers 28 during installation. The conical contact area 34 on the underside of the head 7 compensates mounting tolerances in the axial direction, and spreads the latching fingers 28 apart as the connection is released. The release force needed to release the connection can be defined by the inclination of the contact area 34 in conjunction with the spring action of the latching fingers 28.

In order to fasten the trim part 2 to the support part 6, the connecting part 4 is first arranged on the trim part 2 in front of the opening 19 of the receptacle part 3, as shown in FIG. 1, and then pushed in the direction of the arrow into the receptacle part 3. As this is taking place, the pocket 18 accommodates the flange 21, and the fastening section 22 passes through the entry region 12 and the narrow point 13 to reach the end region 14. The width of the narrow point 13 may be slightly smaller than the diameter of the fastening section 22, so that the connecting part 4 has to be pushed into the end region 14 with a certain force. In this way, the narrow point 13 ensures that the connecting part 4, once it has been placed in the receptacle part 3, cannot slip out of it—for example, while being transported into the installation position.

Figure 4:
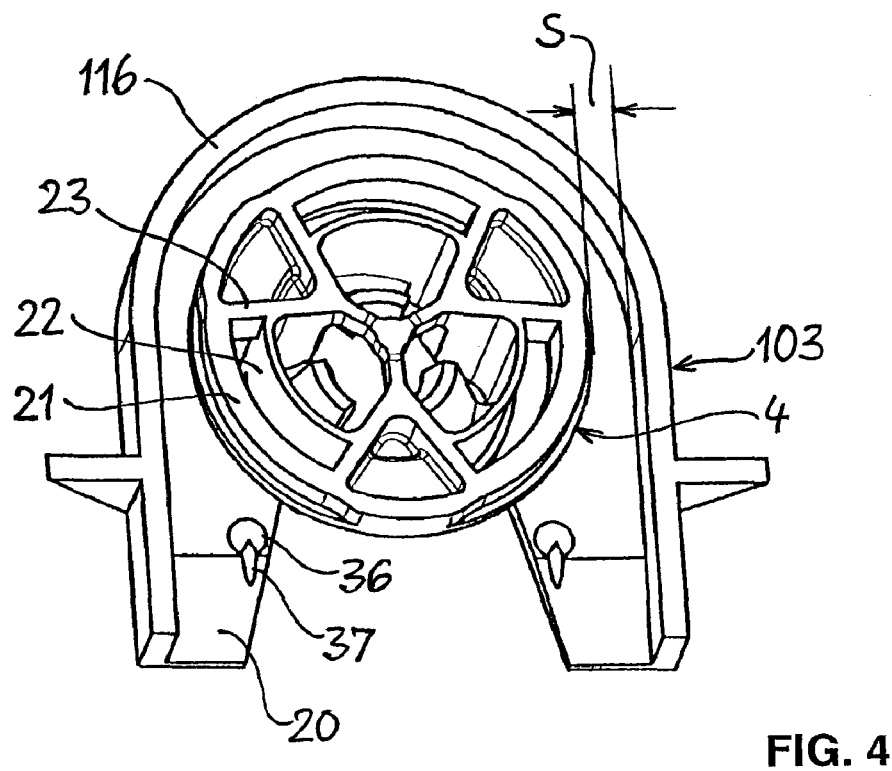
Figure 6:
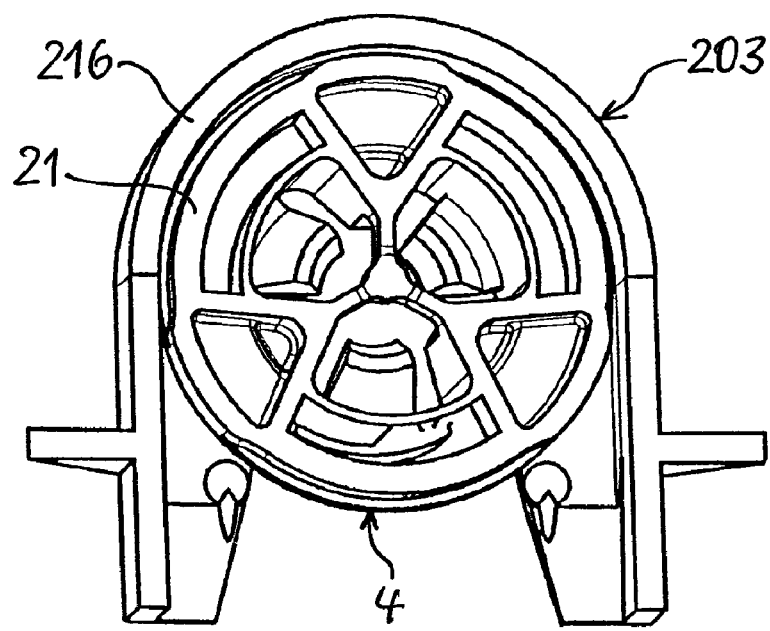

As an alternative to the narrow point 13, bumps 36 in the shape of spherical caps may be arranged on the side of the plate 10 facing the trim part, as shown in FIGS. 4 and 6, which bumps act in combination with the flange 21 and secure the connecting part 4 against slipping out of the receptacle part 3. In addition, short ramps 37 may be arranged on the entry side of the bumps 36 in order to make insertion easier.

Once the connecting part 4 has been inserted in the receptacle part 3, the trim part 2 is moved, with the connecting part 4 forward, towards the support part 6 in such a way that the retaining stud 5 can enter the insertion opening 26. If the retaining stud 5 is eccentric to the insertion opening 26 when this is done, then the guide surfaces 27 of the wall sections 25 bring about the necessary centering. During centering, the connecting part 4 can also shift radially in the receptacle part 3 if the receptacle part 3 is oversize to compensate for manufacturing tolerances. Pressing the trim part 2 onto the support part 6 causes the retaining stud 5 to be pressed into the fastening section 22 until it rests against the stop 31, as shown in FIG. 2. The head 7 of the retaining stud 5 is centered by the fluted wall sections 25 during this process, and is held in the center position after reaching the endpoint. The latching fingers 28 are initially spread apart by the head 7, and then spring back to the position shown in FIG. 2, in which they brace against the contact area 34. In this position, the latching fingers 28 hold the connecting part 4 securely on the support part 6, so that the trim part 2 connected to the connecting part 4 by the receptacle part 3 is likewise held on the support part 6.

Figure 3:
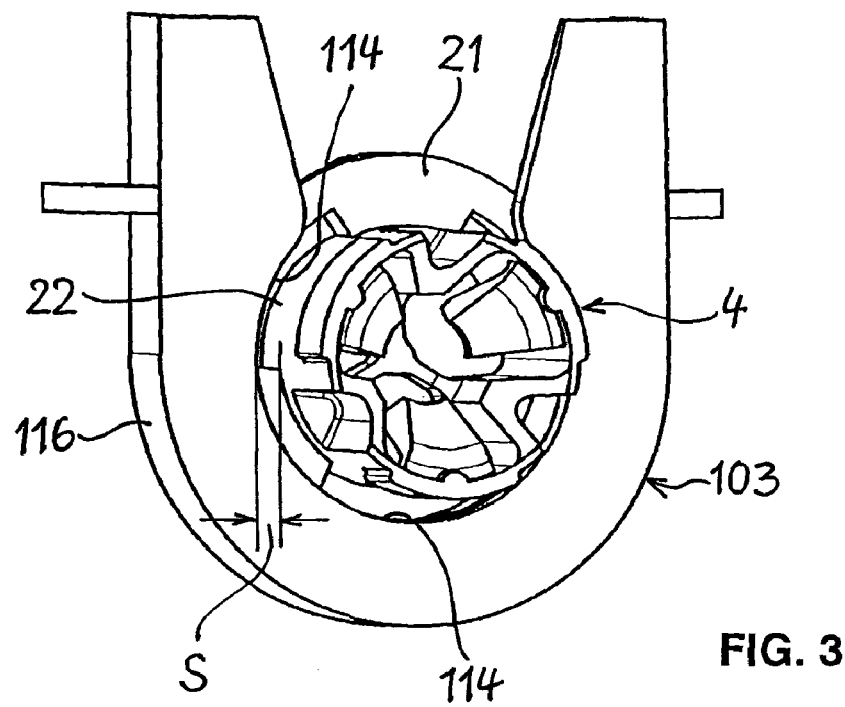

Shown in FIGS. 3 and 4 is a receptacle part 103, connected to a connecting part 4, that is intended to compensate dimensional variations. The receptacle part 103 has an end region 114, which has a larger diameter than the fastening section 22 of the connecting part 4. Because of the existing difference in diameters, when the fastening section 22 is centered in the end region 114, a clearance S is present between the two on all sides. In like manner, the radius of the curved section of the projecting wall 116 is larger by at least the clearance S than half the outside diameter of the flange 21 of the connecting part 4. The connecting part 4 can therefore compensate dimensional variations of the magnitude of the clearance S on all sides.

Figure 5:
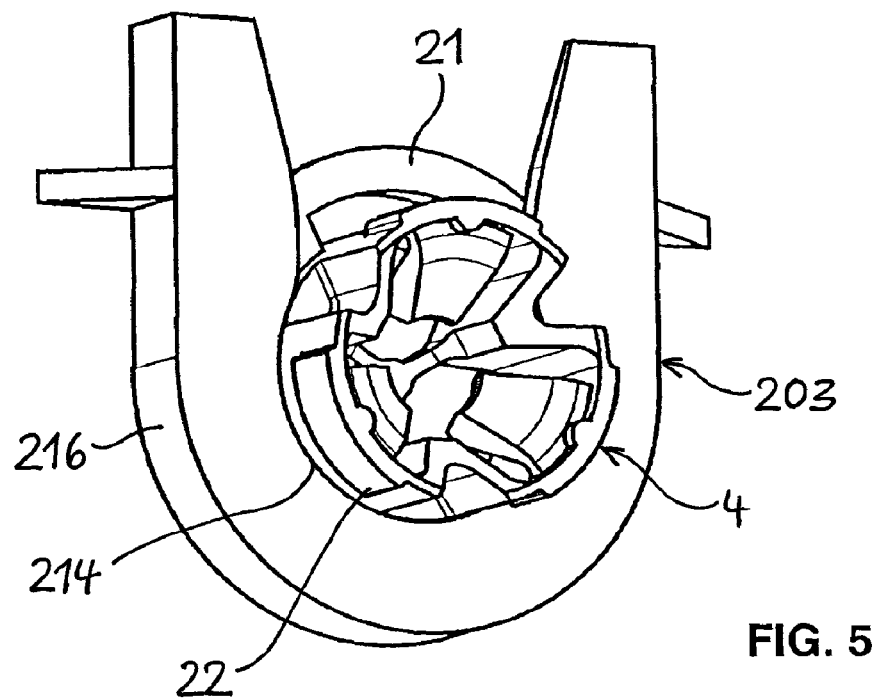

In FIGS. 5 and 6, a variant embodiment of the inventive fastener is shown that is intended as a fixed point for precisely positioned alignment of the connected parts. In this embodiment, the receptacle part 203 has an inside diameter in the end region 214 that is essentially equal to the outside diameter of the fastening section 22. In addition, the radius of the curved section of the projecting wall 216 is essentially equal to half the outside diameter of the flange 21 of the connecting part 4. As a result, when the connecting part 4 is placed in the receptacle part 203, it occupies a defined, centered position relative to the receptacle part 203. Since the connecting part 4 is also centered with respect to the retaining stud 5 during installation on a support part 6, the combined action of the receptacle part 203, connecting part 4, and retaining stud 5 results in accurately positioned establishment of this connection point between the trim part 2 and the support part 6.

Although exemplary embodiments of the present invention have been shown and described, it will be appreciated by those skilled in the art that changes may be made to these embodiments without departing from the principles and spirit of the invention, the scope of which is defined in the appended claims and their equivalents.

What is claimed is:

1. A fastener for joining a first workpiece to a second workpiece, the first workpiece bearing a projecting stud with a head distal from the first workpiece, and the stud defines an axial direction, the fastener comprising:
   a receptacle part connectable to the second workpiece and including a pocket with a lateral opening and a guide slot, and
   a connecting part including:
      a flange that can be introduced into the pocket through the lateral opening; and
      a fastening section including a hollow body with a first end of the hollow body attached to the flange, and a second end opposite to the first end defines, an insertion opening to accommodate the stud and includes an elastic retainer located on an inside of the hollow body and projecting radially inward in the opening by which the stud can be held in place in the opening, and wherein an outer wall of the hollow body includes circumferentially alternating cylindrical wall sections and fluted wall sections, and the fluted wall sections project radially into the hollow body and second end faces of the fluted wall sections are beveled in the vicinity of the insertion opening such that they form stud guide surfaces that are inclined in an insertion direction of the stud from radially outward to radially inward.

2. A fastener according to claim 1, wherein the elastic retainer comprise an elastic latching finger that extends axially in the insertion direction from the insertion opening and radially inward on the inside of the hollow body.

3. A fastener according to claim 2, wherein a radially outward end of the elastic latching finger is attached to a cylindrical wall section of the hollow body by an elastically flexible section.

4. A fastener according to claim 3, wherein the cylindrical wall sections have a first wall thickness and include a reinforcement having a second wall thickness greater that the first wall thickness in an area at which the latching finger attaches to the cylindrical wall.

5. A fastener according to claim 4, wherein the flange of the connecting part has a circular ring whose inside diameter is greater than the outside diameter of the fastening section, and the ring is connected to the fastening section by radial webs.

6. A fastener according to claim 5, wherein at least one intermediate space between two radial webs is closed by a smooth wall on a side facing the insertion opening.

7. A fastener according to claim 1, wherein the receptacle part comprises a plate partially defining an open guide slot, and a U-shaped wall that projects from a first side of the plate.

8. A fastener according to claim 7, wherein a cover plate is attached to an edge of the wall that is distant from the plate.

9. A fastener according to claim 8, wherein the receptacle part is an integral part of the second workpiece, and wherein the cover plate is integrated in the second workpiece.

10. A fastener according to claim 7, wherein the guide slot has an entry section that grows larger toward the outside and has a narrow point.

11. A fastener according to claim 7, wherein the plate has, in an edge region adjacent to the entry of the guide slot, a first ramp surface located on the first side of the plate and that is inclined toward the edge.

12. A fastener according to claim 8, wherein the plate of the receptacle part is provided with at least one raised bump that is located on the first side of the plate and has a distance from the cover plate that is slightly smaller than a thickness of the flange of the connecting part.

13. A fastener according to claim 12, wherein a second ramp that facilitates insertion is located on a side of the bump.

14. A fastener assembly for joining a first workpiece to a second workpiece, the first workpiece bearing a projecting stud with a head distal from the first workpiece, and the stud defines an axial direction, the fastener assembly comprising:
   a receptacle part comprising:
      a bottom plate;
      a top plate defining an axial through slot and the slot is open in a first radial direction; and
      an axial wall joining the top plate and the bottom plate and defining a radial opening in the first radial direction; and
   a connecting part comprising:
      a fastening section including a hollow body with a first end and a second end opposite to the first end and defining a first diameter, at the first end the hollow body defines an axial opening to accommodate the insertion of the stud and includes an elastic retainer located on an inside of the hollow body and projecting radially inward in the axial opening and by which the stud head can be held in place in the opening, and wherein the hollow body further includes circumferentially alternating radial inward wall sections and radially outward wall sections, and the radially inward wall sections include at the first end axially facing guide surfaces that slant axially toward the second end; and
      a flange located at the second end of the connecting part and defining a second diameter larger than the first diameter, and
   wherein the flange of the connecting part is radially insertable into the radial opening defined by the wall of the receptacle part, and the fastener section is radially insertable in the slot defined by the top plate.

15. A fastener assembly according to claim 14, wherein the bottom plate is a part of the second workpiece.

16. A fastener assembly according to claim 14 wherein, the top plate has an outer side and an inner side, and on the inner side adjacent to the radial opening the inner side includes a ramp surface slanting axially toward the bottom plate.

17. A fastener assembly according to claim 15 wherein, wherein the top plate of the receptacle part further includes a bump that is located on the inner side and projecting toward the bottom plate, and the bump is located radially such that when the connecting part is inserted into the receptacle part, then the bump is radially outward of the flange of the connecting part.

* * * * *